Patented Dec. 3, 1940

2,223,904

UNITED STATES PATENT OFFICE 2,223,904

PROCESS FOR THE PRODUCTION OF COMPRESSED FODDER MIXTURES

Max Zentz and Fritz Noll, Munich, Germany

No Drawing. Application March 20, 1939, Serial No. 263,093. In Germany March 21, 1938

5 Claims. (Cl. 99—8)

The present invention relates to a process for the production of compressed fodder mixtures, particularly suitable for feeding domestic and breeding animals as well as fishes. Compressing of fodder is not new in itself. But hitherto, the material used for the production of such compressed fodder had to be prepared carefully, consisting in sufficient cleaning and in the first place grinding. A binding material was required, for which purpose fat was used in the first place. The product obtained in this way was exceedingly hard and could only be made in the form of artificial grains or small cubes.

Hitherto, vegetable raw materials, such as straw, hay, grain or the like, were not used in their original state for producing compressed fodder. When this material is compressed, the cake formed will soon fall to pieces again, especially owing to the fact that the material is still breathing and expands after being pressed.

It was surprising to find that vegetable raw materials of every kind in a coarse-crushed state can be formed into compressed cakes that keep well if the material is subjected to an extraordinarily high pressure of about 700 to 1500 atmospheres. In this case no other binding material is required to hold the cake together, the produced briquettes keeping their shape for a practically unlimited period.

The new briquettes can be produced with any known type of pressing device, provided the mentioned pressure can be obtained. But a briquette press, such as is used for making coal-briquettes, has proved to be particularly suitable. These briquette presses not only have the advantage of an extraordinary working capacity, but the pressing operation is at the same time divided into various stages, the material being first subjected to the pressure of the die and subsequently, when being discharged by the boss of the pressing head, pressed once more on all sides. This division of the pressing operation is very favourable for the cohesion of the ready briquette.

It is advisable to adjust these presses so as to run with a speed of about 60 to 70 revolutions per minute and to discharge about every second one briquette in the shape and size of a normal brown coal briquette. Such a working speed of the press has been found to comply with the binding power of the organic material, though, according to the kind and state of the raw material, the shape of the pressing boss, etc., it may be possible to adjust the press to a greater or smaller working speed. The cohesion of the obtained compressed cakes depends in a certain degree on the shape of the pressing boss and on the pressing speed.

Naturally, the humidity of the raw material makes the latter more or less suitable for pressing. It is advisable to use material with a humidity of 10% to 20% by weight (preferably 12% to 16%).

It has been found to be an advantage if at least one of the ingredients of the compressed fodder is glutinous.

Grain with a natural content of gluten will improve the cohesion of the ready compressed cake. But there are no considerable quantities of gluten required, and it is even possible to use material which is practically free from gluten if a suitable pressure is applied with a corresponding pressing speed and at an appropriate temperature.

The cohesion of the compressed cakes may, as stated, be influenced by regulating the pressing temperature. If slightly heated, the compressed cakes become harder, whereas, by cold pressing, the products obtained are softer. It must be avoided to heat the material up to 60° or 80° C., as is usual in pressing brown coal briquettes, in order to prevent a loss in albumin or any other harm to the raw material. Temperatures of between about 5° and 30° or even 40° C. are admissible.

As raw materials for producing the new briquettes all kinds of substances can be used, for example preferably chaff, chopped straw, hay, oats and other grain, bark, potato flakes, lucerne, yeast, and other agricultural products.

As mentioned, the materials may be used in their natural state without being crushed, for example the oat used for preparing horse fodder should not be crushed beforehand. In spite of their smooth surface, these materials hold together after being pressed in the described manner. The ready briquettes have a smooth, almost vitreous surface and show an excellent cohesion. By carefully regulating the temperature and the filling weight it is possible to produce the briquettes in such a way that a larger number adheres to each other with the pressed surface. Thus, compressed cakes of practically any desired size can be obtained which, for feeding purposes, can easily be broken by hand. Hitherto, the production of such large compressed cakes was quite impossible. The smaller the pieces are, which are obtained in breaking the larger compressed pieces or individual briquettes, the easier it is to further break the broken pieces. This behaviour doubtlessly contrasts with the properties of the usual compressed substances. The new briquettes also have the advantage that, in breaking them, no dust flies about which, as is known, is bad for the animals to be fed.

By the new process, in the first place the volume of the raw material is reduced 5½ to 6 times, which is of definite importance for storing purposes. As the filling chamber of the briquette press should preferably have a length of about 30 cm., briquettes of about 5 cm. thickness are obtained. This reduction in volume is at the same time of decisive importance for transport, storage and packing purposes. In addition there is the further advantage that the briquettes produced by the new process are of practically unlimited durability. After the pressing operation the material expands but very slightly and only within the first 24 hours without impairing the cohesion of the compressed cakes. No addition of any preserving substance is required. The durability of the new compressed fodder under all ordinary influences is excellent without any preservative. When stored in ordinary air, no fermentation nor mould is occasioned even in the summer. Also storing under frost does not change the cohesion of the briquettes. Even storing for longer periods at temperatures much below 0° C. (freezing point) does not lead to bursting of the cake. As in producing the new material the individual ingredients are not destroyed by crushing before or during the pressing operation, the quality of the compressed fodder is practically unchanged, as compared with the raw material, especially retaining the same appetizing smell of hay, straw, and the like, as the fresh materials. When breaking the briquettes, the individual raw ingredients are well distributed and unbroken, clearly visible, arranged at the side of each other. Consequently, the digestibility of the new material is excellent, as has been proved by careful feeding experiments.

All these properties make the new material extraordinarily suitable as a preserve fodder. The material also offers the special advantage that it can be easily packed owing to its small volume.

When using the new material for feeding fishes, it has the great advantage that the compressed material is soaked and dissolved very slowly in water. Therefore, it does not sink to the ground by far as rapidly as the usual fodder which soon after spraying on the water surface serves to feed only the few fishes living on the ground of the water and which is lost for the majority of the fishes moving in a medium depth.

Another advantage of the new material is that the compressed form prevents wasting of raw materials. For example, when grain is fed to the animals in the poultry-yard, a large quantity of the fodder is buried in the ground. This cannot occur when compressed fodder is used, and the picking of the grains from the compressed cake does not cause any difficulties.

It was not expected that the individual ingredients, of which the new fodder is composed, would not be destroyed by the extraordinarily high pressures applied, and that, although they are retained in their original state, there is an excellent cohesion of the material even when stored for longer periods. This fact was all the more surprising, as the application of such high pressures as 100, 300 and more atmospheres does not ensure any cohesion at all. On the other hand, hitherto it was thought that it would not be possible to produce preserved fodder that will keep without destroying the breathing of the natural material by chemical preservatives.

Of course, the new process is not confined to the production of briquettes, as it is also possible to make any other desired pressed shapes of the raw material according to the process of the invention.

What we claim, is:

1. A process for the production of compressed mixed fodder comprising mixing uncrushed grains such as oats with bulky vegetable material such as hay, chopped straw, or lucerne, and compressing said mixture under a pressure of 700 to 1500 atmospheres at a temperature not substantially exceeding 35° C.

2. A process for the production of compressed mixed fodder comprising mixing uncrushed grains such as oats with bulky vegetable material such as hay, chopped straw, or lucerne, bringing said mixture to a humidity content of 10 to 20% and compressing said mixture under a pressure of 700 to 1500 atmospheres at a temperature not substantially exceeding 35° C.

3. A process for the production of compressed mixed fodder comprising mixing uncrushed grain such as oats, with bulky vegetable material such as hay, chopped straw, or lucerne, adding flaky vegetable substances such as potato flakes and compressing said mixture under a pressure of 700 to 1500 atmospheres at a temperature not substantially exceeding 35° C.

4. A process for the production of compressed mixed fodder comprising mixing uncrushed grain such as oats, with bulky vegetable material such as hay, chopped straw, or lucerne, adding flaky vegetable substances such as potato flakes bring said mixture to a humidity content of 10 to 20% and compressing said mixture under a pressure of 700 to 1500 atmospheres at a temperature not substantially exceeding 35° C.

5. A process for the production of compressed mixed fodder comprising mixing uncrushed grains such as oats with bulky vegetable material such as hay, chopped straw, or lucerne, and compressing said mixture under a pressure of 700 to 1500 atmospheres at a temperature not substantially exceeding 35° C. to an endless string on a string press breaking up parts of this string into individual pieces.

MAX ZENTZ.
FRITZ NOLL.